Aug. 17, 1971

LE ROY E. FESSLER 3,600,142

CATALYTIC CONVERTER

Filed Sept. 22, 1969

*INVENTOR:*
*LeRoy E. Fessler*

BY: *James R. Hoatson Jr.*
*Philip T. Liggett*

ATTORNEYS

Aug. 17, 1971  LE ROY E. FESSLER  3,600,142
CATALYTIC CONVERTER

Filed Sept. 22, 1969  2 Sheets-Sheet 2

INVENTOR:
LeRoy E. Fessler

BY: James R. Hoatson, Jr.
Philip T. Liggett

ATTORNEYS

United States Patent Office 3,600,142
Patented Aug. 17, 1971

3,600,142
CATALYTIC CONVERTER
Le Roy E. Fessler, Roselle, Ill., assignor to Universal
Oil Products Company, Des Plaines, Ill.
Filed Sept. 22, 1969, Ser. No. 859,906
Int. Cl. B01j 9/04; F01n 3/14
U.S. Cl. 23—280                                            8 Claims

ABSTRACT OF THE DISCLOSURE

A catalytic converter for treating an engine exhaust stream which embodies a segment-cylinder-form catalyst retaining section supported by the outer housing in a slideable manner. In a preferred embodiment there is provided maximum catalyst volume with minimum inlet area. Also, in a preferred arrangement, the converter has a catalyst reservoir therein which serves as a storage for fresh catalyst particles that flow into the catalyst retaining section, replacing catalyst particles lost by attrition.

---

The present invention is directed to an improved catalytic converter for use in the catalytic oxidation and conversion of exhaust gas streams and more particularly to a converter construction which incorporates a segment-cylinder-form catalyst retaining section supported by the outer housing of the converter in a slideable manner, thus preventing structural damage due to temperature differentials within the converter.

The desirability of removing or converting the noxious compounds of vehicular exhaust gases has been generally well established. The unavoidable incomplete combustion of hydrocarbon fuel by a gasoline engine results in the generation of substantial quantities of unburned hydrocarbons, and undesirable products, which, as waste products, discharge into the atmosphere through the exhaust line. Such partially oxidized products, and part or all of these components, contribute to the air pollution problem presently facing various geographical areas of the world.

In a catalytic operation, the hot gases issuing from the motor exhaust manifold are passed through a catalyst bed maintained within a conversion zone, so as to affect a more or less complete oxidation of carbon monoxide and unburned hydrocarbons present in the exhaust stream. It is sometimes desirable to premix the exhaust gases issuing from the exhaust manifold with a quantity of secondary or combustion air before directing the gases into the converter; however, this is no longer considered absolutely necessary in a converter system, since most modern carburetion systems initially provide a supply of excess air to the engine, thus establishing surplus air in the exhaust stream. The use of a catalytic method in an apparatus provides for the initiation of the oxidation reaction at a lower temperature than might otherwise be possible, and its use effectively eliminates the need for an igniting means, such as a spark plug, which is generally used with most types of "after burners" or other apparatus which depend strictly upon thermal conditions.

Heretofore, converters have usually been designed to be cylindrical or circular in shape or else to take the form of conventional mufflers of an automobile, which are generally of a flat rectangular or oval form. The circular type converter provides two basic advantages. The first advantage is that of ease in construction, i.e., the circular design permits use of standard type parts in addition to easy fabrication of parts not standard. Also, the circular design allows for a symmetrical construction, thus permitting ease in fabrication of the various parts. The second advantage is the fact that a cylindrical bed of catalyst particles will permit maximum catalyst volume in a minimum sized converter. For example, a flat bed having a thickness of three inches would have to have a width of approximately 22 inches to have the same volume of catalyst material as in a cylindrical bed of three inches thickness having an outside diameter of ten inches and the same length. Of course, the flat bed does provide a flat shaped converter which is the more desirable under certain installation conditions, e.g., in engine compartments or under the body of the automobile. Usually, the cylindrical converter has an "in to out" flow pattern as its preferred arrangement. This establishes a smaller inlet area to the catalyst particles, which has the advantage of establishing a more efficient conversion zone. In other words, the minimum inlet area, into a catalytic bed, conserves the heat energy within the exhaust gas. Thus, as exhaust gas is introduced into the catalyst bed, it contains a higher level of sensible heat than would be the case if the exhaust gases were introduced into a flat bed with the same volume of catalyst particles. This is important since it has been found that in order to achieve maximum catalyst life and maximum conversion, the sensible heat should be as high as possible. Thus, the cylindrical bed with "in to out" flow will establish a generally efficient converter.

The flat bed, as previously mentioned, has the distinct advantage in that its shape enables the converter to be installed in relatively flat spaces. Its disadvantage manifests itself in the fact that a flat converter is more difficult to manufacture than its cylindrical counterpart. It has been found that a flat converter having the same volume of catalyst particles as a cylindrical or circular converter will cost as much as one third more to manufacture.

The converter of this invention combines the advantages of the flat converter with that of the cylindrical or circular converter by utilizing a segment-cylinder-form catalyst retaining section with "in to out" flow. The resulting efficiency itself will permit the utilization of an overall smaller converter, thus conserving space and permitting engine compartment or under the hood installation.

One of the major problems encountered in the use of a catalytic converter in an exhaust system is the problem of structural failure induced by large thermal gradients within the converter. High temperatures are produced as a result of the exothermic oxidation reaction taking place within and around the catalyst bed. Depending upon the particular catalyst employed, the operation of the motor vehicle, that is, whether the motor is being operated under conditions of idle, accelerate, cruise, or decelerate, converter temperatures may run as high as 1200 degrees to 2000 degrees Fahrenheit. A practical catalytic converter should therefore be designed to eliminate the problems due to temperature differentials, which may cause deformation, split seams, etc., as a result of uneven thermal expansion.

A practical converter should also be arranged so that a uniform distribution of exhaust gas flow through the catalyst bed is maintained in order to achieve maximum catalyst life and maximum conversion. As heretofore mentioned, it is also important that the physical size of the converter be minimized, yet providing maximum catalyst volume, thus permitting the installation of the converter in the engine compartment of the automobile or, in other words, in the closest proximity to the engine exhaust gas manifold. It is also desirable to have a converter construction that embodies a reservoir section which serves as storage for fresh catalyst particles that flow into the catalyst retaining section for replacement of particles lost through attrition and/or shrinkage.

It is thus the principal object of this invention to provide for a catalytic converter construction that embodies the advantages of a cylindrical type converter and the advantages of a flat bed converter and yet retain a minimum of their disadvantages. More specifically, it is a principal object of this invention to provide for a converter construction that has embodied within it a segment-cylinder-form catalyst retaining section.

Another object of this invention is to provide for a converter construction which allows for the various components of the converter to expand and contract relative to each other as the temperature of the apparatus fluctuates.

Another object of this invention is to provide for a catalyst converter construction that embodies a catalyst reservoir section which serves as storage for fresh catalyst particles that flow into the catalyst retaining section replacing particles lost by attrition and shrinkage.

Still another object of this invention is to provide for a catalyst converter construction that is susceptible to simplification of manufacturing techniques.

In a broad aspect, this invention provides a catalytic converter for containing catalytic material therein for treating an engine exhaust stream comprising an outer housing, a longitudinal catalyst retaining section for containment of said catalytic material defined by a first, segment-cylinder-form, perforate partition, a second segment-cylinder-form perforate partition spaced inwardly from said first perforate partition and blocking means to prevent gas flow through the resulting open ends of the spaced partitions, said catalyst retaining section being disposed in said outer housing and spaced therein to form an exhaust gas inlet manifold section and an exhaust gas outlet manifold section, exhaust gas inlet means into said inlet manifold section, and a treated gas outlet means from said outlet manifold section.

In a preferred embodiment, the curved cylinder-form perforate partitions have substantially semi-circular cross sections to provide a semi-annular form catalyst retaining section. This particular shape should not be considered limiting for other cylinder forms are considered within the scope of this improvement, and the semi-circular cross-sectional area of the annular form catalyst bed is merely a convenient form susceptible to simplified manufacturing techniques. In a preferred arrangement, the cylinder-form partitions have outwardly facing flanged portions on their longitudinal open edges. These are sized so that the lower side of the flanged portion of the second perforate partition can be placed on the upper side of the flanged portion of the first perforate partition. Normally, this placement will be such that the second cylinder-form partition is concentrically located within the first partition. Thus, there is formed a substantially uniform semi-annular shaped catalyst retaining section. In this particular arrangement, the outer housing comprises a longitudinal inlet plate section and a longitudinal outlet plate section. The longitudinal edges of these plates are shaped and adapted to abut each other and be sealed together. They are also shaped to hold the flanged portions of the cylinder-form perforate partitions in a slideable manner, once being sealed together.

The plate sections, of course, must be shaped in their central portion to establish the manifold sections of the converter. In the preferred arrangement, the central portion of the inlet plate section is formed to establish an inlet manifold section of decreasing transverse cross-sectional area in the downstream direction. The rate of decrease in cross-sectional area is programmed to establish the best form of gas pressure distribution across the perforate partition of the inlet manifold section. Normally, this would mean that the cross-sectional area should vary directly proportional to the length of the bed. In other words, at half the distance along the perforate partition, the cross-sectional area of the inlet manifold section should decrease by half its original area. At three fourths of the distance along the perforate partition of the inlet manifold section, the cross-sectional area should be reduced by 75 percent of the original area. This would create a fairly complicated, curved surface, inlet plate section. Therefore, it is considered to be within the scope of this present improvement to approximate the reduction in cross-sectional area by simpler curved surfaces. For example, the reduction in cross-sectional area may be fabricated by forming the inlet plate section with longitudinally half section cones, or, with a series of increasing sized longitudinally half section cones. The latter would approach the ideal change in cross-sectional area, of course, depending upon the number of increasing sized cones used.

In this preferred arrangement, the central portion of the outlet plate section is formed to establish an outlet manifold section of increasing cross-sectional area in the downstream direction. Again, this can be approximated by forming the central portion of the outlet plate section into a longitudinal sectioned cone. Thus, the flow through the catalyst retaining section is controlled in part by the inlet and outlet manifold sections of varying cross-sectional area. This variance in cross-sectional area creates a flow pattern that establishes a generally uniform pushing force through the catalyst retaining bed, and yet, it is of such a construction that enables it to be manufactured by relatively simple manufacturing techniques.

As mentioned hereinbefore, the ideal flow path through an annular bed converter is the "in to out" flow pattern. Thus, the preferred embodiment of this improvement has the concave surface of the second perforate section as the surface that provides the gas inlet means to the catalyst retaining section from the inlet manifold section.

In an alternate embodiment, and particularly for a horizontally positioned converter having an "in to out" flow pattern, an additional partition is attached within the legs of the segment-annular-form catalyst retaining section to form a catalyst reservoir means next to the main body of the catalyst retaining section. Perforations or openings of a large enough size to allow passage of catalyst particles, are then provided in this otherwise imperforate partition. Thus, when the converter is substantially horizontally disposed, with the inlet surface being the uppermost surface, catalyst particles within the reservoir will flow downward through these openings into the catalyst retaining section to fill any voids created by attrition.

The substantially horizontal positioning of this particular converter embodiment with the inlet perforate section located near the top is considered a preferred arrangement, for it not only establishes catalyst particle flow from the reservoir downward through the openings into the catalyst retaining bed, but in addition, this arrangement permits or establishes an exhaust gas flow downward through the catalyst retaining section, into the outlet manifold section. Actually, downward gas flow will exist even when the converter is positioned in other than a horizontal position; i.e., the converter may be sloped in either longitudinal direction. By referring to the positioning of the converter as "substantially horizontal" it is therefore meant to encompass a positioning whereby predominant flow is downward. On the contrary, a vertical positioned converter may have some downward flow; however its flow would be predominantly transverse. The converter may also be rolled and still maintain a predominant downward flow of gases therein. For example, it can be rolled until the horizontal plane intersects the highest level of the inlet perforate section of a less than semi-circular perforate section and still maintain predominant downward flow.

Downward flow of exhaust gases is generally thought to be a preferred flow pattern, i.e., the downward flow of exhaust gases through a catalytic bed generally causes catalyst particles to be packed tightly throughout the retaining section. The present converter design may well be used in another position, but on the other hand, an upward flow or predominantly transverse flow, when in another position, generally will cause catalyst particles to float within the catalyst retaining section. Floating of catalyst particles introduces a major problem into the operation of the converter, that being the loss of catalyst particles through attrition. Since the particles are, in effect, floating, they are moving relative to each other. This relative motion causes the particles to rub together, gradually wearing down the size of each particle. As the particles diminish in size, they eventually will be lost through the perforations in the perforate wall sections. This loss, although relatively small over a short period of time, can affect the operation of the converter over an extended period of time. This is especially troublesome today, since it is thought that a properly designed converter may well last up to 50,000 miles of operation time.

In one embodiment the catalyst retaining bed is held in position in a slideable manner by the inlet and outlet plates. This particular design will tend to absorb any expansion within the converter due to temperature differentials inherent in the operation of any converter system.

In a preferred arrangement, the inlet plate section and the outlet plate section are additionally shaped at their ends to provide the inlet and outlet means of the manifold sections. Thus, in its simplest form, this particular improved converter can be manufactured by mere utilization of four formed pieces of material: the inlet plate section, the outlet plate section, the inlet perforate cylinder-form section, and the outlet cylinder-form section. Of course, two end sections serving as a blocking means to the flow of gases longitudinally through the catalyst bed must be installed at the ends of the catalyst bed itself. The design and construction of the present improved converter, as well as other advantageous features in connection therewith, are better set forth and explained by reference to the accompanying diagrammatic drawing and the following description thereof.

Figure 1:
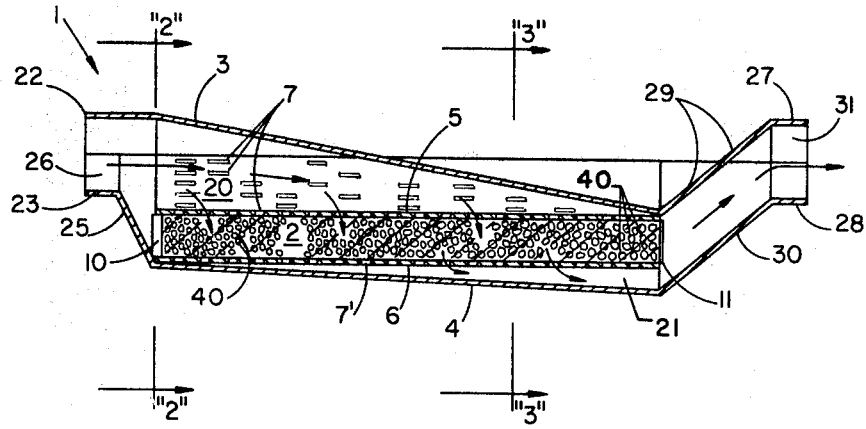
FIG. 1 of the drawing is a longitudinal cross-sectional view of one embodiment of the converter of this invention.

With reference to the drawing, and more particularly to FIGS. 1, 2, 3 and 5 thereof, it is shown that the converter comprises an outer housing 1 and a segment-annular-form catalyst retaining section 2. The outer housing 1 comprises in this particular arrangement two plates, an inlet plate section 3 and an outlet plate section 4, each fabricated out of a single piece of material. The catalyst retaining section is formed by two partitions or sections 6 and 5, which over the major portion of their surface have perforations 7′ and 7 therethrough. In the present arrangement, the particular shape of these segment-cylinder-form sections is semi-circular thus forming a semi-annular catalyst retaining section 2. This semi-circular shape should not be limiting upon this present improvement, for other segment-cylinder-form, perforate partitions are contemplated. ("Cylinder" as used herein refers to a curved surface formed by the movement of a line or element parallel to a fixed line. A "segment-cylinder-form" refers to a part of a closed cylinder; i.e., a semi-circular-cylinder-form would be one special example of a segment-cylinder-form; a one fourth-oval-cylinder-form illustrates another, less limiting, example.) For instance, the catalyst retaining section may be formed by perforate plates in the form a segment-oval-cylinder. The semi-circular-form merely establishes a convenient retaining section shape that is susceptible to simplified manufacturing techniques and which presents the optimum inlet surface area when utilizing the converter in an "in to out" flow arrangement. In this particular embodiment, the outlet perforate partition is defined by the first or outer cylinder-form 6 while the inlet perforate partition is established by the concave surface of the second or inner cylinder-form 5.

Figure 5:
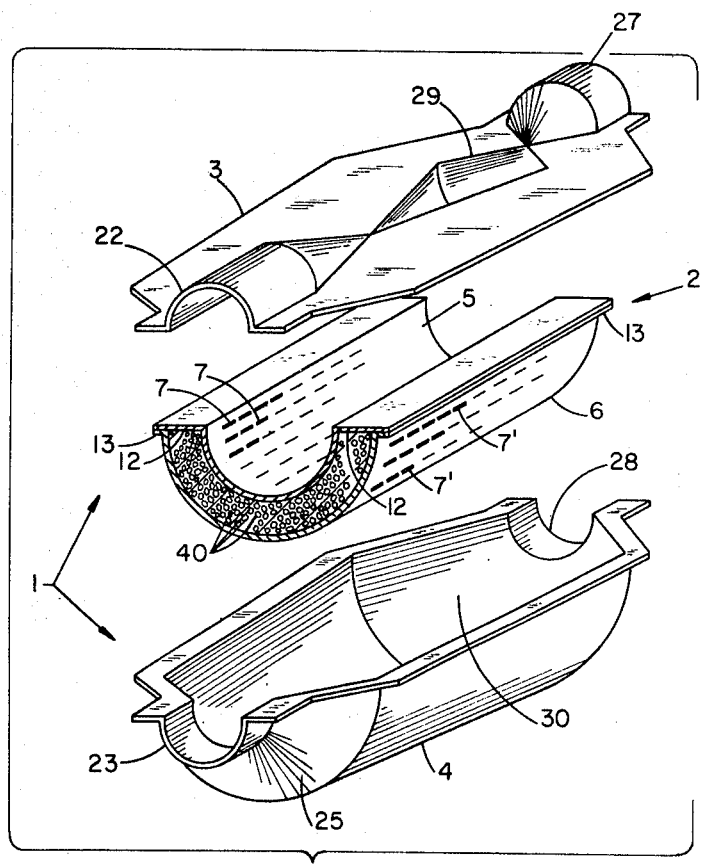
FIG. 5 is a diagrammatical pictorial exploded view of the embodiment of FIG. 1 showing the major components therein.

Although not shown in the pictorial view of FIG. 5, it is noted that in FIG. 1 there are provided plates 10 and 11 to block any flow through the open ends of the catalyst retaining section 2. It is also to be noted that perforate sections 5 and 6 have flanged portions 12 and 13, respectively, located on their longitudinal open edges. Flanged portions 12 serve a dual purpose, one being the blocking means to prevent gas flow through the longitudinal open ends of the catalyst retaining section. The other purpose is to maintain the second semi-circular-cylinder-form perforate partition in a spaced relation from the first or in this case outlet perforate partition. In other words, the flanged portion 12 is sized so that its lower surface can be disposed on the upper surface of flanged portion 13 in such a way that the second or inner perforate section 5 is concentrically located within the first or outer perforate section 6. Thus, there is provided a simple means by which the second semi-circular partition can be supported to form semi-annular section 2. It is to be noted that flanged portion 12 is imperforate in nature so to prevent any possible flow of gas therethrough. In fabricating section 5 and flanged portion 12, the manufacturer has a choice. He can either weld a separate imperforate section to a perforated section to form the described combination, or he can form the initial perforate section out of a plate leaving a border to therefore provide the imperforate part 12.

The catalyst retaining section is supported within the outer housing by the housing itself. In other words the housing, comprising two plates 3 and 4, is so shaped to hold the flanged portions of the perforate partitions in a slideable manner. This particular shape is more clearly illustrated in FIGS. 2 and 3 of the drawing. There it is shown that the plates 3 and 4 are formed near their edges to form space 15 and 15′. This space should be of such a size so as to hold the flanged portions 12 and 13 in a slideable manner. The space 15 should not be so great as to permit an absolutely free movement of the flanged portions for this would most likely cause the converter to rattle or allow gas to bypass. It should, however, permit free expansion of the catalyst retaining section within the converter when temperature differentials are created by the reactions within the converter. It is also contemplated, however, that the catalyst retaining section be fixed to the housing in a rigid manner. It is noted, that at least the longitudinal edges of the plates 3 and 4 are shaped so that they abut each other at 16 and 16′, respectively, along their entire length. The type of connection resulting from the use of sections 3 and 4 will permit the utilization of various production techniques to seal the connection either permanently or temporarily. For example, such an arrangement will permit either edge joint welding at 17 and 17′, or resistance welding to establish a joint at 16 and 16′. It is also contemplated that this connection be sealed by use of a clamping device either temporarily or permanently, or by rivets or bolts. Still further, the connection may be sealed by turning and rolling the two abutting surfaces upwardly or downwardly to produce a joint similar to a "tin can" type joint construction.

Figure 2:
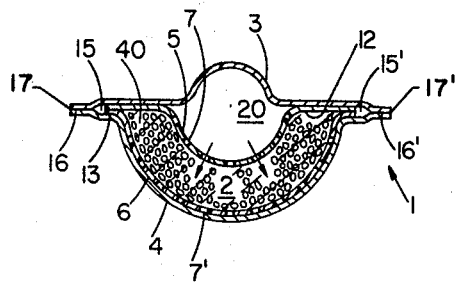
FIG. 2 is a cross-sectional view of the embodiment of FIG. 1 as taken through line 2—2.
Figure 3:
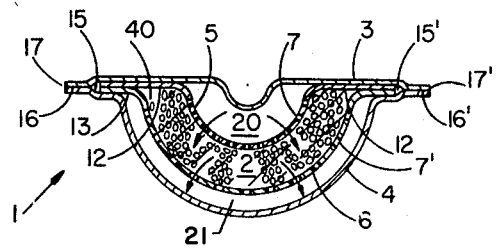
FIG. 3 is a cross-sectional view of the embodiment of FIG. 1 as taken through line 3—3.

The outer housing, comprising plates 3 and 4, must be formed so that when the locating of the catalyst retaining section is completed, there is established an exhaust gas inlet manifold section and an exhaust gas outlet manifold section. In this particular embodiment, the exhaust gas inlet manifold section communicates with the second or inner semi-circular perforate partition 5 which provides the gas inlet surface to the catalyst retaining section 2. The inlet manifold section is indicated by numeral 20 and its particular shape is defined by the inner surface of plate 3 and the concave surface of the inner perforate partition 5. As indicated in FIG. 5, the shape of the plate 3 in its central portion is a longitudinal section of two right circular cones. This particular shape will result in an inlet manifold section of decreasing cross-sectional area in the downstream direction. The longitudinal section of this particular manifold section is illustrated in FIG. 1. FIG. 2 illustrates its cross-section at its widest part. FIG. 3 illustrates its cross section at a point downstream and demonstrates how the cross-sectional area of 20 decreases in size. At the termination of the catalyst retaining section the inlet manifold section, itself, terminates. Of course, at that end of the catalyst retaining section, inlet perforate section 5 must abut plate 3 tightly so as to prevent bypass of any untreated exhaust gases thereby. In fact, the inner plate 5 may be affixed to plate 3 to effectuate a seal.

The outlet manifold section 21 is formed by the inner surface of outlet plate 4 and the convex surface of outlet perforate section 6. Plate 4 has a central portion shaped as a half-sectioned truncated cone with its smallest diameter coinciding to the outside diameter of the catalyst retaining section. This is illustrated in FIG. 2 where it is shown that no outlet manifold section exists at that point. To allow for longitudinal expansion, the perforate section 6 may be disposed in a free manner at that location. A longitudinal space (not shown) can be provided to allow for any such expansion. The need for a seal here is unnecessary, since the pressure on the inlet side would be less than the pressure on the outlet side. The conically shaped plate thus forms an outlet manifold section 21 of increasing cross-sectional area in the downstream direction. A typical cross-sectional shape of this manifold section is illustrated in FIG. 3. The gases thus flow from the inlet manifold section 20 down through the openings 7 in perforate partition 5 through the catalyst retaining section 2, down through the opening 7' of perforate section 6 into the outlet manifold section 21.

It should be noted that by incorporating the tapered inlet manifold section 20 and the tapered outlet manifold section 21 for the distribution and collection of the exhaust gas stream flow withint he interior of the converter, that the effects of the velocity head of the exhaust stream upon he catalyst is minimized. The reduction in the cross-sectional area of the inlet manifold of the gas flow together with the reverse situation in the gas collection or outlet manifold section, such that there is an increased cross-sectional areas in the direction of the gas flow therein, provides for a substantially uniform flow or driving force across the catalyst bed at any one point. A particular advantage of the combination of the outer housing plates 3 and 4 and the catalyst retaining section 2, defined by plates 5 and 6, is the simplicity of construction for establishing the greatest possible uniformity of contact of exhaust gas with the catalyst particles throughout the retaining section between the perforate plate sections 5 and 6.

It should be noted that the limitations of the space defined by the inlet and outlet manifold section as presented in this particular embodiment should not be limiting upon this present improvement. It is contemplated that the cross-sectional areas of these manifold sections be uniform in size across their entire length. It is also contemplated that they vary in size to a different degree than herein described. For instance, for ideal flow in the inlet manifold section it is thought that the cross-sectional area of such a section should decrease in size in direct proportion to the length of the bed. Such a relationship does not exist in the present embodiment, for under most operations it is not thought to be that critical. However, it is possible to form plate 3 in such a way to make the cross-sectional area change vary according to this relationship. This can be accomplished in an approximate way by the use of a series of increasing cross-sectional area cone sections in the downstream direction. It can also be accomplished in a more accurate sense by forming a double curved cone section. It follows that the outlet manifold section 21 can be formed to create the ideal change in cross-sectional area by a similar procedure.

In this present embodiment, the inlet means and outlet means are also formed by the plates of the housing. In other words, plates 3 and 4 have been so shaped at their ends to be adapted to connection to conventional exhaust or tail pipes. It is noted, as indicated in FIG. 5 that the central portion of the end of plate 3 has been formed into a semi-circular cross section 22 and likewise the inlet central end portion of plate 4 has been formed into a cylindrical semi-circular cross section 23. Of course, a transitional conically shaped section 25 had to be provided on plate 4 to establish the proper location of semi-circular portion 23. Thus, when plates 3 and 4 are mated together they form the inlet 26.

Similarly, the outlet ends of the plate sections 3 and 4 have been formed with semi-circular cross-sectional portions 27 and 28, respectively, for connection to a conventional exhaust pipe. To locate the semi-circular cross sections in their proper plane, conical section 29 on plate 3 and conical section 30 on plate 4 have been formed therein. Thus, when plates 3 and 4 are connected together, outlet 31 is formed.

Figure 6:
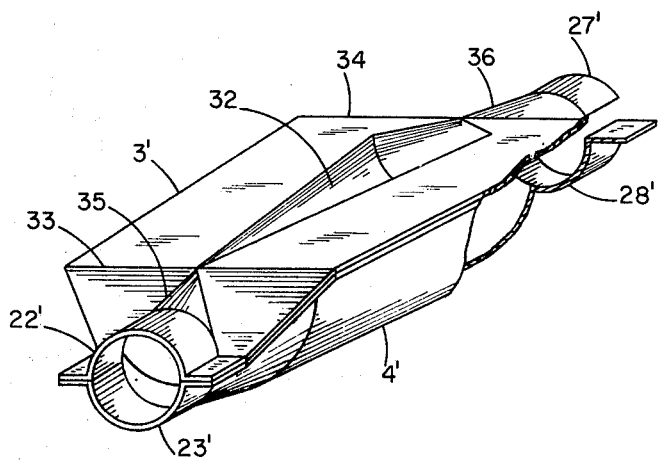
FIG. 6 is a diagrammatic pictorial view of an alternate arrangement of the plate sections of the present converter.

An alternative embodiment of the converter is illustrated in FIG. 6, where the inlet and outlet means have been formed out of plates 3' and 4' in a plane lower than the highest level of plate 3'. In this particular arrangement, the inlet manifold section is defined by the concave surface of the inner perforate partition (not shown) and by a quarter-sectioned cone 32. Of course, the same considerations that went into the converter of the preferred embodiment in respect to the design of the inlet manifold section, relate to this particular embodiment and conically shaped section 32 should be designed with this in mind. The major distinctive feature of this particular embodiment is the fact that the plate 3' has been bent downward at 33 and 34, and the semi-circular cross sections 22', 23', 27', and 28' have been put in a lower relative plane. To meet this criteria, additional conically shaped sections 35 and 36 have been incorporated into the formation of plate 3'.

The embodiment of FIG. 6 has the one distinct advantage of having a flatter cross-sectional area. In other words, assuming that the depth of plate 4' is equal to the depth of plate 4 of the preferred embodiment, there is no projection on plate 3' at a higher plane to the main body thereof. This is especially helpful in situations where space limitations are important considerations in the design of the converter. Generally, however, the converter of FIGS. 1 through 5 is the preferred arrangement for both plates 3 and 4 in that particular embodiment can be stamped in a single operation while the embodiment of FIG. 6 probably requires an additional stamping step to incorporate the lower positions openings defined by 22', 23', 27', and 28'.

Figure 4:
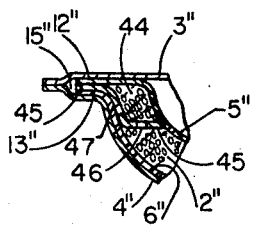
FIG. 4 is a partial cross-sectional area of an alternative embodiment of the present converter illustrating a reservoir section therein.

Referring to the preferred embodiment, it is noted that within the catalyst retaining section 2, are located subdivided catalyst particles 40. For most efficient converter operations, the catalyst retaining section 2 should be filled to capacity. Depending on the operating conditions of the converter itself, and the type of catalyst particles actually used, the loss of catalyst particles may create a problem in regard to maintaining the catalyst retaining section full. With this in mind, it is also considered within the scope of this present improvement to provide a catalyst reservoir within the converter. The particular shape of a semi-circular annular retaining section permits a reservoir to be disposed within the bed without changing the outer dimensions of the converter. In FIG. 4, a preferred embodiment of the converter with a catalyst reservoir means is illustrated. The reservoir section 44 is located in the upper leg of one of the legs of the semicircular annular retaining section. Of course, although not shown, a similar reservoir section could be and for greatest efficiency, should be located in the opposite leg thereof. The retaining section, itself, has been modified to the extent that plate 5'' is not perforated in the region of the reservoir; nor is plate 6''. The reservoir, itself, is defined by the latter two plates and also by a generally imperforate partition 45 which is curved to fit between the flanged portions 12'' and 13'' of plates 5'' and 6'', to run parallel at 47 to partitions 6'' and to run transverse to the leg of the semi-circular annular retaining section 2''. An opening 46 is provided at this point along the catalyst reservoir as means to establish flow from the reservoir down into the main body of the catalyst retaining section. Generally, similar openings would be provided along the length of partition 45. Of course, to allow for the increased size resulting from the insertion of plate 45 between flanged portions 12'' and 13'', the outer plate 3'' and 4'' have to be shaped to provide a larger space 15'' for location of the flanged portions therein.

With regard to the catalyst, it is not intended to limit this improved type of catalytic converter to any one particular type of oxidation catalyst, inasmuch as there are various known effective and efficient catalyst compositions. Suitable oxidation catalysts include the metals of groups 1, 5, 6, 7, and 8 of the Periodic Table, particularly chromium, copper, nickel, and platinum. These components may be used singly, or in combinations of two or more, etc., and will generally be composited with an inorganic refractory support material, such as alumina, silica-alumina, silica - alumina - zirconia, silica - thoria, silica-boria, or the like.

In the operation of the converter, the exhaust gases issuing from the exhaust manifold of the automobile engine are directed into the inlet conduit 26 into the tapered inlet manifold section 20. Passing down through the inlet manifold section, the high gas velocity eventually develops into a fairly uniform pressure head, because of the tapered cross-sectional area of the inlet manifold section 20. The gases are then directed through perforations 7 of the inlet semi-circular-form perforate plate section 5 into the catalyst retaining space of section 2. The unburned components in the exhaust gases are oxidized within the catalyst section to form generally harmless components therein. After oxidation, the gases are passed into tapered outlet manifold section 21 through perforations 7' out through the space defined by the conically shaped sections 29 and 30 through the outlet 31, which is adapted to be connected to the exhaust pipe of the automobile. Because of the tapered inlet manifold section and the tapered outlet manifold section, the effect of the high pressure head at the downstream end of the catalyst retaining section is reduced, and there is flow uniformity and a resulting highly efficient converter.

From the foregoing description, it is seen that this particular converter is of such a construction that damage due to temperature differentials will be minimized, i.e., the slideable or expansible nature of the fit of the perforate sections to the outer housing, as well as the provision for longitudinal expansion thereof, will prevent expansion problems from developing. The converter also manifests a construction that is relatively inexpensive, especially in the case of mass production techniques, since it is basically to be made of four major components. The particular shape of the components enables the manufacturer to use techniques of stamping, blanking, and relatively simple metal forming operations.

The semi-circular or cylindrical shape of the catalyst retaining section permits maximum catalyst volume in a minimum space. The downflow arrangement through the catalyst retaining section prevents the catalyst particles therein from floating and being lost through the process of attrition. In addition, the preferred arrangement of having an "in to out" flow provides a minimum inlet area to the converter retaining section. This has the beneficial effect of retaining high sensible heat within the converter itself, thereby establishing high efficiency therein. The present invention also establishes a converter that permits the installation of a reservoir section in a converter with the same outside dimensions as one without the reservoir section. The generally semi-circular cross section of the converter also introduces the advantage of being relatively flat, thereby permitting installation into relatively shallow spaces.

It is again to be noted, that the semi-circular shape of the partitions forming the catalyst retaining section as herein described should not be limiting upon this present improvement, for although, this semi-circular shape has proven to be the most convenient form, other segment-cylinder-form shapes are contemplated as being within the scope of this invention. In other words, the catalyst retaining section may be formed by one third portions of oval shaped cylinder pieces.

It is desirable that these components be made of lightweight relatively thin gauge material, whether of ordinary steel or an alloy, such that the assembly is relatively lightweight and such that the temperature effects may also be accommodated by some material flexure without causing breakage of seams and joints. The material used should also be of a character that is able to withstand the high temperatures resulting from the operation of the converter. It is also noted that in some instances the catalyst retaining section may be reinforced with stiffening members bridging the space between the perforate sections 5 and 6.

It is also considered as within the scope of this present improved design and construction to provide for a covering of the outer walls of the converter with a suitable insulation material, such as asbestos, mineral wool, or the like, in order to maintain the maximum amount of heat within the catalyst retaining section. Also considered within the scope of this invention, is the provision for a fill plug, for access to the catalyst retaining section 2. It may well be understood that various minor modifications in the design and or location of the various portions of this converter may be made without diverting from the scope of the present invention. For example, there may be a variation in the shape and spacing of the various sections from that as indicated on the drawing, or in locating and designing the outlet and inlet means. The apertures 7 and 7' located on the perforate sections will, of course, be sized in relation to the size of the catalyst particles which are to be maintained within the apparatus. The physical shape for catalyst particles may be such that they are in the form of spheres, cylinders, or pellets, typically having a dimension of one sixteenth to one quarter inch, although particles of larger or smaller dimensions may be employed where desirable. Mixed sizes of catalysts may also be well utilized especially as a means to provide for a low temperature catalytic oxidation process. Also the catalytic material may be in the form of impregnated fibers which in turn may be placed in a mat-like bed arrangement. It is also contemplated that the catalytic material be formed into a rigid shape corresponding to that of the retaining section, e.g., bonding subdivided particles into a desired form with a bonding material.

I claim as my invention:

1. A catalytic converter for containing catalytic material therein for treating an engine exhaust stream comprising an outer housing having a first and second plate, one of said plates comprising two longitudinally disposed cone sections, the apices of said cone sections being disposed adjacent each other and the concavities thereof being oppositely disposed to each other, a longitudinal catalyst retaining section for containment of said catalytic material defined by a first, segment-cylinder-form perforate partition, a second segment-cylinder-form perforate partition spaced inwardly from said first perforate partition and blocking means to prevent gas flow through the resulting open ends of the spaced partitions, said catalyst retaining section being disposed in said outer housing and spaced therein to form a first exhaust gas manifold section with said cone sections and a second exhaust gas manifold section with the other plate, said manifolds forming inlet and outlet manifold sections communicating with said catalyst retaining section, exhaust gas inlet means into said inlet manifold section, and a treated gas outlet means from said outlet manifold section.

2. The converter of claim 1 further characterized in that the transverse cross-sectional area of said inlet manifold section decreases in the downstream direction and the transverse cross-sectional area of said outlet manifold section increases in the downstream direction.

3. The converter of claim 1 further characterized in that the concave surface of said second perforate section provides the gas inlet surface to the catalyst retaining section from said inlet manifold section.

4. A catalytic converter for containing catalytic material therein for treating an engine exhaust stream comprising an outer housing, a longitudinal catalyst retaining section for containment of said catalytic material defined by a first, segment-cylinder-form, perforate partition, a second segment-cylinder-form perforate partition spaced inwardly from said first perforate partition, said perforate partitions having substantially semi-circular cross sections to provide a semi-circular formed catalyst retaining section, and blocking means to prevent gas flow through the resulting open end of the spaced partitions, said cylinder-form partitions having outwardly facing flanged portions, the lower side of the flange portions of said second perforate partition being disposed on the upper side of the flanged portion of said first perforate partition, said catalytic retaining section being disposed in said outer housing and spaced therein to form an exhaust gas inlet manifold section and an exhaust gas outlet manifold section, exhaust gas inlet means into said inlet manifold section, and a treated gas outlet means from said outlet manifold section.

5. The converter of claim 4 further characterized in that said outer housing comprises a longitudinal inlet plate section and a longitudinal outlet plate section, the longitudinal edges thereof are shaped and adapted to abut each other and be sealed together and to abut and hold the flanged edge portions of said perforate partitions in a slideable manner.

6. The converter of claim 5 further characterized in that the central portion of said inlet plate section is formed to establish an inlet manifold section of decreasing cross-sectional area in the downstream direction.

7. The converter of claim 6 further characterized in that central portion of said outlet plate section of the housing is formed to establish an outlet manifold section of increasing cross-sectional area in the downstream direction.

8. The converter of claim 6 further characterized in that said plate sections of the housing are shaped to provide the inlet and outlet means of said manifold sections.

References Cited

UNITED STATES PATENTS

| 2,185,584 | 1/1940 | Boyco | 23—288.3F |
| 3,146,073 | 8/1964 | Johnson | 23—288.3F |
| 3,149,925 | 9/1964 | Scheitlin | 23—288.3F |
| 3,380,810 | 4/1968 | Hamblin | 23—280.3F |

JAMES H. TAYMAN, JR., Primary Examiner

U.S. Cl. X.R.

23—2; 55—516, 519; 60—29; 181—35, 63